Nov. 7, 1967   E. A. KALLET ET AL   3,351,756
PLANET SENSOR HAVING A PLURALITY OF FIXED DETECTORS ABOUT
TWO ORTHOGONAL AXES AND A PARTIALLY ATTENUATING MASK
CENTRALLY LOCATED IN THE FIELD OF VIEW OF THE
DETECTORS AND SMALLER THAN THE TOTAL
FIELD OF VIEW
Filed July 8, 1964

INVENTORS
ELI A. KALLET
PHILIP WARDHAM COLLYER
BY
ATTORNEY though he is should be understood that this term does not mean that it is exactly proportional to the departure of the vehicle attitude from the predetermined central position. Once the image has moved 1° along either axis, one of the pair of detectors

United States Patent Office 3,351,756
Patented Nov. 7, 1967

3,351,756
PLANET SENSOR HAVING A PLURALITY OF FIXED DETECTORS ABOUT TWO ORTHOGONAL AXES AND A PARTIALLY ATTENUATING MASK CENTRALLY LOCATED IN THE FIELD OF VIEW OF THE DETECTORS AND SMALLER THAN THE TOTAL FIELD OF VIEW
Eli A. Kallet, Teaneck, N.J., and Philip Wardham Collyer, Stamford, Conn., assignors to Barnes Engineering Company, Stamford, Conn., a corporation of Delaware
Filed July 8, 1964, Ser. No. 381,069
6 Claims. (Cl. 250—83.3)

ABSTRACT OF THE DISCLOSURE

A horizon sensor with pairs of radiation detectors in reflecting cones, the field of view of the cones substantially touching, is provided with imaging means to image a target, such as a very small image of a distant planet, onto the point where the cones meet when the vehicle provided with the sensor is in level flight. This produces an image of the target much smaller than the field of view of any cone. A mask is used which is partially transmitting and is centered over the point where the cones meet. It is larger than the target image but smaller than the field of view of a cone. When the vehicle tilts, the image moves and as it moves off one cone and onto the other, there is a proportional signal and this proportional signal is continued on for further movement as the target image moves off the attenuating mask into the cone. For example, the tilt which still gives a proportional signal output may be increased by a factor of as much as 5.

Horizon sensors of various types, including conical scan sensors, fixed radiation detector sensors, and the like, are used in space and high flying vehicles to permit determination of the attitude of the vehicle with respect to a planet on two orthogonal axes representing pitch and roll. Problems have arisen, particularly for space vehicles such as vehicles for lunar exploration and the like, by reason of the fact that at a great distance a planet may represent a disc having quite a small subtense. For example, in the case of the moon, at a distance of 65,000 miles, the subtense would be only 2°.

If there is a large array of radiation detectors, such as thermopiles, along each axis, the problem is not particularly serious, but such large arrays, even with the most effective sequential sampling of detectors, present added complication, increased power consumption, and reduced reliability. It is desirable, therefore, where practical, as in manned vehicles, to use much simpler horizon sensors, for example one using only four thermopiles or other detectors. These detectors may be at the bottom of reflecting cones which are arranged in a cluster of four, the entrance apertures of the cones constituting four circles tangent to each other. Alternatively, field lenses may be used instead of the cones to collect and focus energy on the detectors, or the detectors themselves might be placed directly in the focal plane. A single objective or collecting optic may be used, and the attitude of the vehicle determined by the relative amount each of the detectors is illuminated by the target image. The electrical output on each of the two axes is derived by taking the difference voltage between the two opposing detectors. This simplified sensor, however, presents problems.

One of the principal problems is encountered when there is a small subtense of the planet due to great distance. Let us assume a 2° moon disc. In the ordinary four-cone sensor there will be a zero signal with respect to both axes if the image of the disc is centered at the entrance apertures of the four cones. If then the attitude changes with respect to either axis, and the image begins to shift so that one detector of a particular pair receives more radiation than does the other, there will be a signal, the polarity of which indicates the sense in which the attitude of the vehicle has departed from center position, and the amplitude of which indicates the magnitude of the deviation. This transfer function has a characteristic slope for a limited range of deviations only. This slope will be referred to as proportional, although is should be understood that this term does not mean that it is exactly proportional to the departure of the vehicle attitude from the predetermined central position. Once the image has moved 1° along either axis, one of the pair of detectors is fully illuminated and the other receives no radiation at all. As a result, the signal reaches a maximum and there is no further proportional change with further departure. This presents a serious problem if the motion of the vehicle is sufficiently rapid so that it exceeds the 1° in either direction along either axis. The problem can be acute regardless of whether the signal output is shown on a meter for a manned vehicle, or whether it automatically actuates correcting mechanisms through suitable servo drives. In each case the region of proportional response may be too small for satisfactory operation. For this reason, in many cases, the more complicated, heavier, and less reliable horizon sensors with an array of a large number of radiation detectors have been considered necessary.

Summary of the invention

The present invention permits increasing the useful proportional region of signal output by a factor of 5; in other words, a proportional signal will be obtained for departures of plus or minus 5° on either axis instead of 1°. This makes the simple four-cone-and-detector sensor practical under circumstances where the ordinary simplified sensor would have an insufficient region of proportional signal response.

Essentially the present invention involves a mask centered with respect to the central point where the entrance apertures of the four cones are tangent to each other. This mask attenuates the radiation incident on it, for example by a factor of 50%, although the exact amount of attenuation does not alter the principles of the present invention. Let us consider a 2° image centered at the point of tangency of the four entrance apertures of the cones. The signal will, of course, be zero. As the image moves along either axis, one radiation detector will receive more radiation than the other, although in the case of both of them the radiation is going through the mask which attenuates to a greater or less degree. There will then be a signal which will increase as the attitude of the vehicle departs from centering until one detector receives all of the illumination. Then as the image moves further a portion of the focusing cone of radiation goes off the edge of the mask and so is not attenuated, and therefore the signal will continue to increase up to about 5° departure. Depending upon the nature of the mask, the signal, while continuing to be proportional, may show a differeing steepness of slope as the focussing cone leaves the mask.

The relative slopes of the signal transfer function are determined by the amount of mask attenuation, and, as will be pointed out below, mask shape. These factors will be chosen to produce an optimum transfer function, and it is an advantage of the present invention that, within very wide limits, the transfer function can be chosen for the most desirable results. Mask attenuation can either be by a uniform mask having a given attenuation, or the mask may be in the form of a mesh or finely perforated disc. It is a matter of no concern how the attenuation is effected, and the different types of masks have their advantages and disadvantages, and it is an advantage of the present invention that the optimum type of mask may be chosen.

In addition to the attenuation effected by the mask, there is another factor which also permits variation and adds to the flexibility of the invention. This is mask shape. An ordinary circular mask can be used, and for some purposes has advantages. However, if it is desired to change the slope of the transfer function as the image leaves the central portion of the mask, the mask may have different shapes. For example, it may have a four-pointed star shape. This will cause the transfer function, as the central portion of the mask is left, to change less abruptly. Other shapes of masks may also be used to effect desirable changes in the slope of the transfer function.

Radiation detectors have been referred to rather generally, and, of course, any suitable radiation detectors may be used. However, for many horizon sensor purposes, for example in the case of moon probes or in the case of planets having an atmosphere with cold clouds near the horizon, it is advantageous to operate in the rather far infrared, for example with wavelengths greater than 13 or greater than 14 microns. In such a case suitable optics are chosen, and suitable filters, and of, course, the radiation detector used must have the proper characteristics. For the far infrared, thermal detectors are the most practical. It is true that photodetectors such as doped germanium can be used in the far infrared, but only when cooled down to extremely low temperatures, which may present an insuperable problem in a space vehicle because of excessive power demands for cooling to temperatures down to liquid hydrogen or liquid helium.

Among the thermal detectors it is possible to use either thermistor bolometers or thermopiles. The latter have important advantages, and are therefore preferred, although in its broadest aspects, the invention is not limited to their use. Thermopiles require no bias voltage, and when uniformly illuminated produce an accurate null signal more or less independent of the nature of the radiation. Ambient temperature also has but little effect on thermopiles, but has quite marked effect on thermistor bolometers. This is not to say that thermistor bolometers cannot be used for certain purposes, but the advantages of thermopiles are so great that ordinarily they will be chosen.

It is not essential that the radiation used be in the far infrared if the nature of the planet in question permits. Thus, for example, in the case of the planet Venus, the high temperature of the planet and its relatively uniformly radiating atmosphere are such that much shorter wavelength infrared may be used, which permits in some cases the use of thermistor bolometers, and even certain photodetectors.

*Description of the preferred embodiments*

Figure 1:
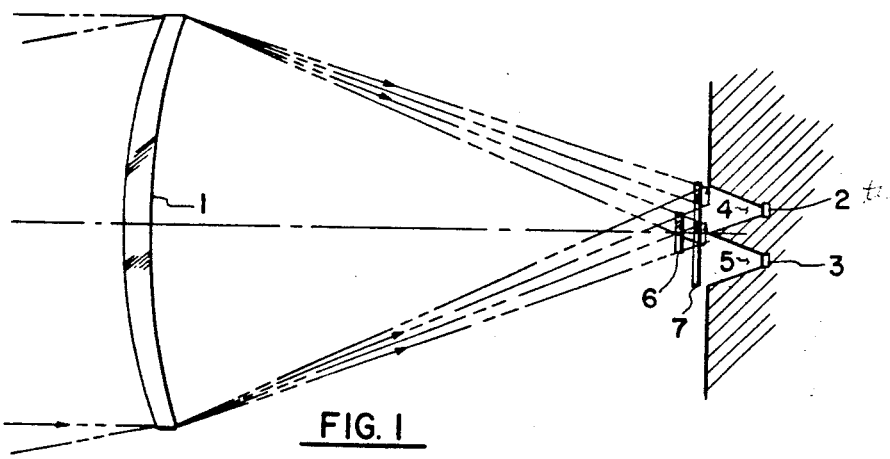
FIG. 1 is a diagrammatic view through the optics.
Figure 2:
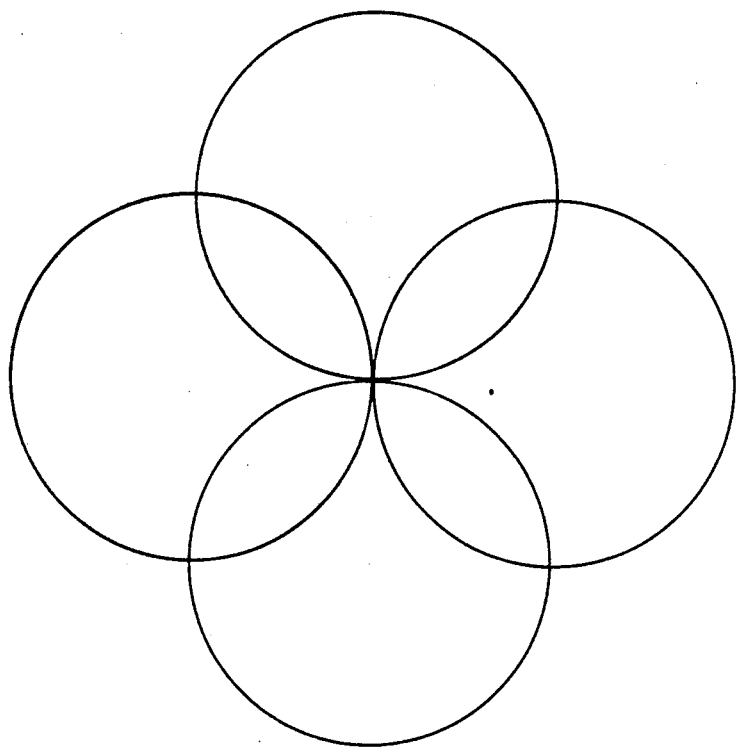
FIG. 2 is a plan view of the four cones.

In FIG. 1 a silicon lens 1 is used for the collecting optics. This figure is described in conjunction with the use of far infrared radiation, which, as has been pointed out above, constitutes the preferred modification. The entrance apertures of the four cones, two of which are shown in the cross-section of FIG. 1, are in the focal plane of the objective. At the bottom of each cone is a thermopile 2 and 3 respectively, the cone being numbered 4 and 5. A mask of silicon having 50% transmission at the long wave infrared is shown centered at 6 followed by a filter 7 which eliminates wavelengths shorter than the desired 13–14μ. The mask is shown as circular, but, of course, may be of any desired shape, as has been pointed out above. Its size may be modified and its placement slightly changed.

FIG. 1 shows two conditions, one where the image of the planet is accurately centered and all of its radiation is on the mask, and secondly where it is in an extreme position and irradiates only cone 4 with its detector 2 but not attenuated at all by mask 6. A simple silicon objective is shown, and for many purposes this presents advantages. However, of course, the present invention is not concerned with the collecting optics, and other designs, including catoptric or catadioptric systems, may be used. It is also possible to replace the four cones with four field lenses as stated earlier.

We claim:

1. In a horizon sensor having pairs of radiation detectors arranged to sense motion along two orthogonal axes and imaging means for directing energy from a target thereon, the improvement which comprises, a partially attenuating mask substantially centrally located with respect to the pairs of radiation detectors of a size greater than target image size but substantially less than the field of view of each of the detectors so that movement of a target image along the orthogonal axes produces a proportional signal output even after the image has moved so that only one radiation detector of a pair is illuminated.

2. A horizon sensor according to claim 1 in which the mask is circular.

3. A horizon sensor according to claim 1 in which the radiation detectors are positioned at the apices of reflecting cones.

4. A horizon sensor according to claim 3 in which the radiation detectors are thermopiles.

5. A horizon sensor according to claim 4 comprising means for restricting radiation striking the thermopile to infrared radiation longer than about 13μ.

6. A horizon sensor according to claim 5 in which the collecting optics are a silicon objective.

References Cited

UNITED STATES PATENTS

| | | | |
|---|---|---|---|
| 3,007,051 | 10/1961 | Amara et al. | 250—83.3 |
| 3,193,682 | 7/1965 | Weiss | 250—83.3 |
| 3,205,361 | 9/1965 | Albus | 250—203 |
| 3,205,362 | 9/1965 | Dryden | 250—203 |

RALPH G. NILSON, *Primary Examiner.*

S. ELBAUM, *Assistant Examiner.*